United States Patent
Larsen

(10) Patent No.: US 12,117,215 B2
(45) Date of Patent: Oct. 15, 2024

(54) VALVE HAVING A MOTOR ARRANGED INSIDE A TUBE HAVING SECTIONS WITH DIFFERENT DIAMETERS

(71) Applicant: Danfoss A/S, Nordborg (DK)

(72) Inventor: Sigurd Larsen, Nordborg (DK)

(73) Assignee: DANFOSS A/S, Nordborg (DK)

(*) Notice: Subject to any disclaimer, the term of this patent is extended or adjusted under 35 U.S.C. 154(b) by 428 days.

(21) Appl. No.: 17/415,472

(22) PCT Filed: Nov. 7, 2019

(86) PCT No.: PCT/EP2019/080497
§ 371 (c)(1),
(2) Date: Jun. 17, 2021

(87) PCT Pub. No.: WO2020/126201
PCT Pub. Date: Jun. 25, 2020

(65) Prior Publication Data
US 2022/0065507 A1    Mar. 3, 2022

(30) Foreign Application Priority Data
Dec. 20, 2018 (EP) ...................................... 18214582

(51) Int. Cl.
*F16K 31/04*    (2006.01)
*F25B 41/35*    (2021.01)

(52) U.S. Cl.
CPC .............. *F25B 41/35* (2021.01); *F16K 31/04* (2013.01); *F16C 2361/91* (2013.01); *F25B 2600/2513* (2013.01)

(58) Field of Classification Search
CPC .............. F25B 41/35; F25B 2600/2513; F16K 31/04
See application file for complete search history.

(56) References Cited

U.S. PATENT DOCUMENTS 4,723,753 A * 2/1988 Torimoto ................ F16K 31/04
251/129.08
5,070,906 A   12/1991 Orlandi
(Continued)

FOREIGN PATENT DOCUMENTS

CN    200965070 Y    10/2007
CN    201028094 Y    2/2008
(Continued)

OTHER PUBLICATIONS

Machine translation of JP 2014092172.*
(Continued)

*Primary Examiner* — Kevin F Murphy
(74) *Attorney, Agent, or Firm* — McCormick, Paulding & Huber PLLC

(57) ABSTRACT

A valve (1), in particular expansion valve, is described including a valve element (6) driven by a rotary motor (7), wherein the motor (7) includes a rotor (9) arranged inside a motor section (19) of a tube (14) and a stator (8) arranged outside the motor section (19) of the tube (14) and the rotor (9) is supported by a bearing (15), which bearing (15) is mounted with press fit in a bearing section (16) of the tube (14). Such a valve should have a small motor and a tube which can be produced with low costs. To this end the motor section (19) and the bearing section (17) include different diameters.

14 Claims, 1 Drawing Sheet

(56) References Cited

U.S. PATENT DOCUMENTS

| | | | |
|---|---|---|---|
| 5,146,126 | A | 9/1992 | Hutchins |
| 5,179,977 | A * | 1/1993 | Iwata ............... F16K 31/04 |
| | | | 137/625.5 |
| 5,265,841 | A | 11/1993 | Abrahamsen et al. |
| 5,310,160 | A | 5/1994 | Harck et al. |
| 5,323,811 | A | 6/1994 | Hohmann et al. |
| 6,296,227 | B1 | 10/2001 | Burcham et al. |
| 6,371,442 | B1 | 4/2002 | Hara et al. |
| 6,561,480 | B1 | 5/2003 | Komiya et al. |
| 6,827,330 | B2 | 12/2004 | Holst et al. |
| 7,108,012 | B2 | 9/2006 | Rosko et al. |
| 7,637,116 | B2 | 12/2009 | Park |
| 7,753,074 | B2 | 7/2010 | Rosko et al. |
| 8,720,486 | B2 | 5/2014 | Uchida |
| 9,334,967 | B2 | 5/2016 | Larsen et al. |
| 9,366,353 | B2 | 6/2016 | Ooe et al. |
| 9,416,890 | B2 | 8/2016 | Nissen et al. |
| 9,683,761 | B2 | 6/2017 | Itou et al. |
| 9,816,639 | B2 | 11/2017 | Suzuki et al. |
| 10,022,532 | B2 | 7/2018 | Burdge |
| 10,167,963 | B1 | 1/2019 | Chang |
| 10,344,459 | B2 | 7/2019 | Lu et al. |
| 10,344,884 | B2 | 7/2019 | Harck et al. |
| 10,814,426 | B2 | 10/2020 | Harck et al. |
| 11,112,025 | B2 | 9/2021 | Bartow et al. |
| 11,353,126 | B1 | 6/2022 | Peng |
| 11,543,048 | B2 | 1/2023 | Kowol |
| 2002/0145125 | A1 | 10/2002 | Tomoda et al. |
| 2006/0175565 | A1 | 8/2006 | Nungesser et al. |
| 2009/0020716 | A1 | 1/2009 | Hokazono et al. |
| 2009/0294713 | A1 | 12/2009 | Harada et al. |
| 2012/0085947 | A1* | 4/2012 | Yamaguchi ......... F16K 31/04 |
| | | | 251/65 |
| 2012/0187202 | A1 | 7/2012 | Suzuki et al. |
| 2014/0245778 | A1 | 9/2014 | Suzuki et al. |
| 2016/0369911 | A1 | 12/2016 | Arai |
| 2017/0002931 | A1 | 1/2017 | Shu et al. |
| 2018/0363797 | A1 | 12/2018 | Harck et al. |
| 2019/0368792 | A1 | 12/2019 | Tang et al. |
| 2020/0386340 | A1 | 12/2020 | Lv et al. |

FOREIGN PATENT DOCUMENTS

| | | |
|---|---|---|
| CN | 201121713 Y | 9/2008 |
| CN | 101769389 A | 7/2010 |
| CN | 101776171 A | 7/2010 |
| CN | 101788064 A | 7/2010 |
| CN | 201696713 U | 1/2011 |
| CN | 201764064 U | 3/2011 |
| CN | 201795060 U | 4/2011 |
| CN | 202065504 U | 12/2011 |
| CN | 102606793 A | 7/2012 |
| CN | 102644785 A | 8/2012 |
| CN | 102840372 A | 12/2012 |
| CN | 202674473 U | 1/2013 |
| CN | 202812412 U | 3/2013 |
| CN | 202946690 U | 5/2013 |
| CN | 203082326 U | 7/2013 |
| CN | 203132229 U | 8/2013 |
| CN | 103307339 A | 9/2013 |
| CN | 103363736 | 10/2013 |
| CN | 203223617 U | 10/2013 |
| CN | 103453201 A | 12/2013 |
| CN | 103511636 A | 1/2014 |
| CN | 103574062 A | 2/2014 |
| CN | 103672131 A | 3/2014 |
| CN | 203560537 U | 4/2014 |
| CN | 103775717 A | 5/2014 |
| CN | 103851209 A | 6/2014 |
| CN | 203641643 U | 6/2014 |
| CN | 203686165 U | 7/2014 |
| CN | 103968621 A | 8/2014 |
| CN | 104180050 | 12/2014 |
| CN | 204114185 U | 1/2015 |
| CN | 104696581 A | 6/2015 |
| CN | 204387344 U | 6/2015 |
| CN | 104791544 A | 7/2015 |
| CN | 104806774 A | 7/2015 |
| CN | 104930241 A | 9/2015 |
| CN | 104930762 A | 9/2015 |
| CN | 105202199 A | 12/2015 |
| CN | 204878955 U | 12/2015 |
| CN | 105318083 A | 2/2016 |
| CN | 105473919 A | 4/2016 |
| CN | 105716335 A | 6/2016 |
| CN | 105822769 A | 8/2016 |
| CN | 205534296 U | 8/2016 |
| CN | 105972233 A | 9/2016 |
| CN | 106151554 A | 11/2016 |
| CN | 106151646 A | 11/2016 |
| CN | 106439164 A | 2/2017 |
| CN | 106678382 A | 5/2017 |
| CN | 107356025 A | 11/2017 |
| CN | 107461498 A | 12/2017 |
| CN | 207213307 U | 4/2018 |
| CN | 108071701 A | 5/2018 |
| CN | 108317259 A | 7/2018 |
| CN | 108571595 A | 9/2018 |
| CN | 110296267 A | 10/2019 |
| CN | 111765288 A | 10/2020 |
| CN | 113195985 A | 7/2021 |
| DE | 102009031882 A1 | 1/2010 |
| DE | 102017110343 A1 | 11/2018 |
| EP | 1515101 A2 | 3/2005 |
| EP | 1593891 A1 | 11/2005 |
| EP | 1746319 A1 | 1/2007 |
| EP | 1806550 A2 | 7/2007 |
| EP | 1903266 A2 | 3/2008 |
| EP | 1930629 A1 | 6/2008 |
| EP | 2 441 994 A1 | 4/2012 |
| EP | 2505887 A1 | 10/2012 |
| EP | 2557379 A1 | 2/2013 |
| EP | 2620724 A1 | 7/2013 |
| EP | 2642169 A1 | 9/2013 |
| EP | 2679935 A2 | 1/2014 |
| EP | 2768125 A2 | 8/2014 |
| EP | 2781859 A1 | 9/2014 |
| EP | 2801771 A1 | 11/2014 |
| EP | 2952835 A1 | 12/2015 |
| EP | 2963321 A1 | 1/2016 |
| EP | 2986874 B1 | 2/2016 |
| EP | 3001078 A1 | 3/2016 |
| EP | 3026373 A1 | 6/2016 |
| EP | 3029396 A1 | 6/2016 |
| EP | 3056778 A1 | 8/2016 |
| EP | 3062004 A1 | 8/2016 |
| EP | 3098494 A1 | 11/2016 |
| EP | 3109526 A1 | 12/2016 |
| EP | 3116107 A1 | 1/2017 |
| EP | 3171058 A1 | 5/2017 |
| EP | 3249269 A1 | 11/2017 |
| EP | 3671070 A1 | 6/2020 |
| EP | 3671071 A1 | 6/2020 |
| EP | 3671072 A1 | 6/2020 |
| EP | 3671073 A1 | 6/2020 |
| EP | 3672030 A1 | 6/2020 |
| EP | 3387304 B1 | 8/2020 |
| EP | 3875811 A1 | 9/2021 |
| JP | H10220614 A | 8/1998 |
| JP | 2000346227 A | 12/2000 |
| JP | 2004270903 A | 9/2004 |
| JP | 2004289901 A | 10/2004 |
| JP | 2004353721 A | 12/2004 |
| JP | 3817071 B2 | 8/2006 |
| JP | 2006291976 A | 10/2006 |
| JP | 2007139016 A | 6/2007 |
| JP | 3997077 B2 | 10/2007 |
| JP | 4028265 B2 | 12/2007 |
| JP | 4064582 B2 | 3/2008 |
| JP | 4098397 B2 | 6/2008 |
| JP | 4119720 B2 | 7/2008 |
| JP | 3145048 U | 9/2008 |
| JP | 4143761 B2 | 9/2008 |

(56) References Cited

FOREIGN PATENT DOCUMENTS

| | | |
|---|---|---|
| JP | 4143892 B2 | 9/2008 |
| JP | 4224187 B2 | 2/2009 |
| JP | 4230806 B2 | 2/2009 |
| JP | 4263426 B2 | 5/2009 |
| JP | 4265347 B2 | 5/2009 |
| JP | 4335364 B2 | 9/2009 |
| JP | 2009228689 A | 10/2009 |
| JP | 4390299 B2 | 12/2009 |
| JP | 4442788 B2 | 3/2010 |
| JP | 4466888 B2 | 5/2010 |
| JP | 4515045 B2 | 7/2010 |
| JP | 4526290 | 8/2010 |
| JP | 4544927 B2 | 9/2010 |
| JP | 4570473 B2 | 10/2010 |
| JP | 2010281422 A | 12/2010 |
| JP | 4615693 B2 | 1/2011 |
| JP | 4666904 B2 | 4/2011 |
| JP | 2011074936 A | 4/2011 |
| JP | 4680658 B2 | 5/2011 |
| JP | 4695501 B2 | 6/2011 |
| JP | 4713934 B2 | 6/2011 |
| JP | 4758916 B2 | 8/2011 |
| JP | 4808343 B2 | 11/2011 |
| JP | 4822623 B2 | 11/2011 |
| JP | 4831808 B2 | 12/2011 |
| JP | 4881137 B2 | 2/2012 |
| JP | 2012117584 A | 6/2012 |
| JP | 4968761 B2 | 7/2012 |
| JP | 5019862 B2 | 9/2012 |
| JP | 5047046 B2 | 10/2012 |
| JP | 5060689 B2 | 10/2012 |
| JP | 5106135 B2 | 12/2012 |
| JP | 2012237343 A | 12/2012 |
| JP | 5130339 B2 | 1/2013 |
| JP | 2013137041 A | 7/2013 |
| JP | 2013224708 A | 10/2013 |
| JP | 5395775 B2 | 1/2014 |
| JP | 5400122 B2 | 1/2014 |
| JP | 5425661 B2 | 2/2014 |
| JP | 2014043949 A | 3/2014 |
| JP | 2014051996 A | 3/2014 |
| JP | 5480753 B2 | 4/2014 |
| JP | 2014092172 A | 5/2014 |
| JP | 5550362 B2 | 7/2014 |
| JP | 5563862 B2 | 7/2014 |
| JP | 5627188 B2 | 11/2014 |
| JP | 5632406 B2 | 11/2014 |
| JP | 5632525 B2 | 11/2014 |
| JP | 5649365 B2 | 1/2015 |
| JP | 5677349 B2 | 2/2015 |
| JP | 2015056587 | 3/2015 |
| JP | 5696093 B2 | 4/2015 |
| JP | 5707073 B2 | 4/2015 |
| JP | 5725714 B2 | 5/2015 |
| JP | 2015105715 A | 6/2015 |
| JP | 2015113965 A | 6/2015 |
| JP | 5793430 B2 | 10/2015 |
| JP | 5818509 B2 | 11/2015 |
| JP | 5830567 B2 | 12/2015 |
| JP | 2016014453 | 1/2016 |
| JP | 2016023709 A | 2/2016 |
| JP | 2016023711 A | 2/2016 |
| JP | 5881252 B2 | 3/2016 |
| JP | 5916142 B2 | 5/2016 |
| JP | 5926552 B2 | 5/2016 |
| JP | 5943549 B2 | 7/2016 |
| JP | 5982168 B2 | 8/2016 |
| JP | 2016151310 A | 8/2016 |
| JP | 2016153673 A | 8/2016 |
| JP | 5984747 B2 | 9/2016 |
| JP | 6037958 B2 | 12/2016 |
| JP | 2016217451 A | 12/2016 |
| JP | 2016220403 A | 12/2016 |
| JP | 2017025974 A | 2/2017 |
| JP | 6087397 B2 | 3/2017 |
| JP | 6095124 B2 | 3/2017 |
| JP | 2017044286 A | 3/2017 |
| JP | 6109094 B2 | 4/2017 |
| JP | 2017115989 A | 6/2017 |
| JP | 2017123775 A | 7/2017 |
| JP | 6175715 B2 | 8/2017 |
| JP | 6178557 B2 | 8/2017 |
| JP | 6194288 B2 | 9/2017 |
| JP | 2017180525 A | 10/2017 |
| JP | 2017194167 A | 10/2017 |
| JP | 2017194168 A | 10/2017 |
| JP | 2021148182 A | 9/2021 |
| KR | 101313153 B1 | 9/2013 |
| WO | 52371 A1 | 9/2000 |
| WO | 0207290 A2 | 1/2002 |
| WO | 200664865 A1 | 6/2006 |
| WO | 2012109993 A | 8/2012 |
| WO | 2012120844 A1 | 9/2012 |
| WO | 201511881 A1 | 1/2015 |
| WO | 201543536 A1 | 4/2015 |
| WO | 2017168942 A1 | 10/2017 |
| WO | 2017217114 A1 | 12/2017 |
| WO | 2017221612 A1 | 12/2017 |
| WO | 2018133673 A | 7/2018 |
| WO | 2020259901 A1 | 12/2020 |
| WO | 2021125567 A1 | 6/2021 |

OTHER PUBLICATIONS

International Search Report for PCT Serial No. PCT/EP2019/080497 dated Feb. 20, 2020.
First Examination Report for Indian Patent Application No. 202117011588 dated Aug. 13, 2021.
Third Party Observations against European Application No. 18214593.8 dated Jun. 29, 2021.
Third Party Observations against European Patent Application No. 18214582.1 (EP 3671070A1) dated Jun. 23, 2021.
First Examination Report for Indian Patent Application No. 202117014391 dated Sep. 22, 2021.
International Search Report for Application No. PCT/EP2019/080574 dated Nov. 26, 2019.
International Search Report for PCT Serial No. PCT/EP2019/085364 dated Feb. 13, 2020.
Communication pursuant to Article 94(3) EPC for corresponding European Patent Application No. 18 214 582.1, dated Nov. 10, 2022.

* cited by examiner

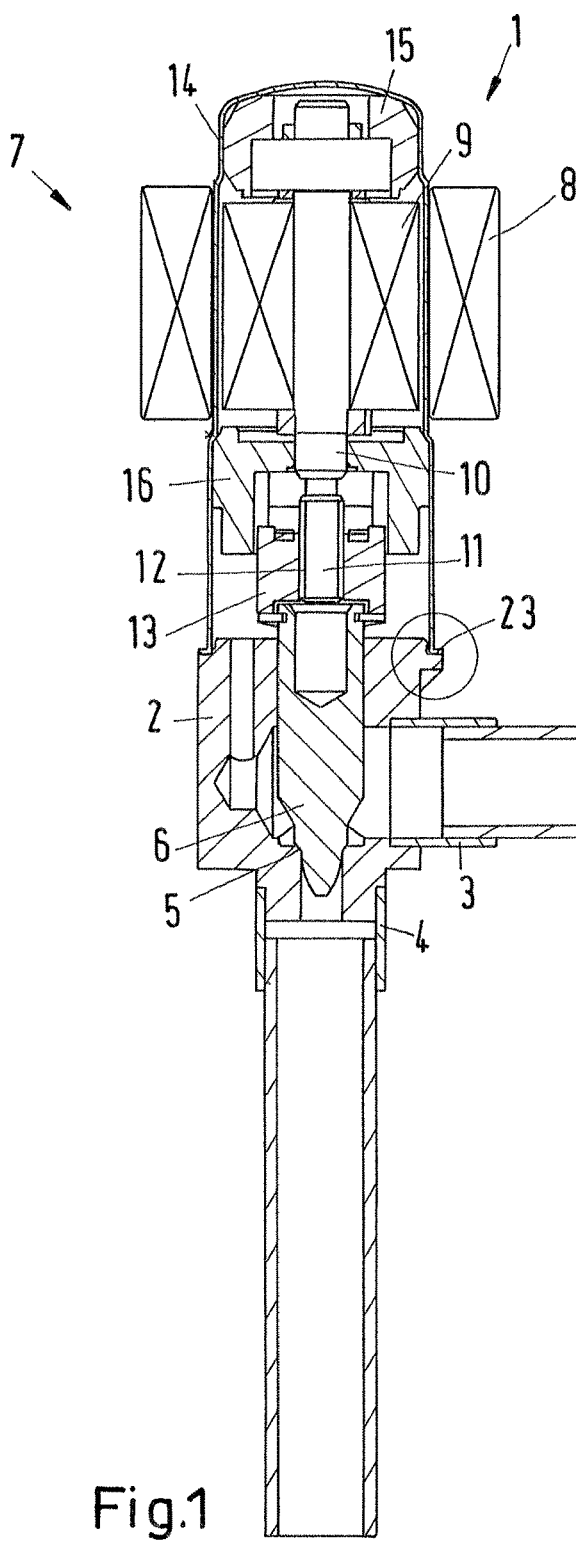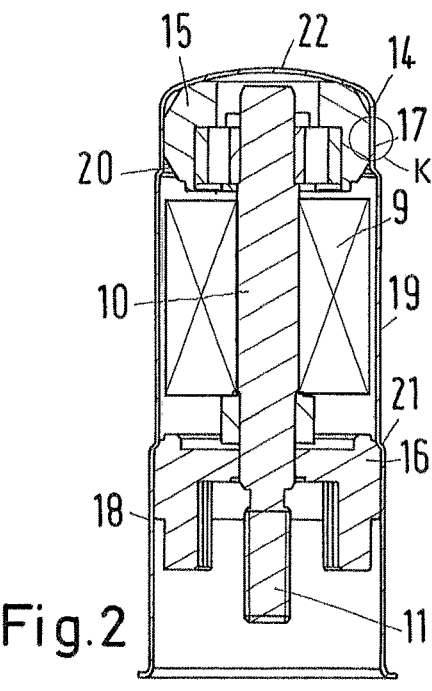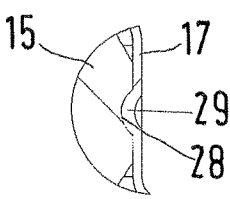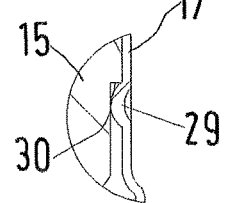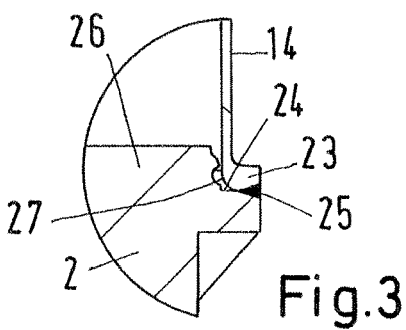

VALVE HAVING A MOTOR ARRANGED INSIDE A TUBE HAVING SECTIONS WITH DIFFERENT DIAMETERS

CROSS REFERENCE TO RELATED APPLICATIONS

This application is a National Stage application of International Patent Application No. PCT/EP2019/080497, filed on Nov. 7, 2019, which claims priority to European Application No. 18214582.1 filed on Dec. 20, 2018, each of which is hereby incorporated by reference in its entirety.

TECHNICAL FIELD

The present invention relates to a valve, in particular an expansion valve, comprising a valve element driven by a rotary motor, wherein the motor comprises a rotor arranged inside a motor section of a tube and the rotor is supported by a bearing, which bearing is mounted in a bearing section of the tube.

BACKGROUND

Such a valve can be used, for example, to control a flow of a refrigerant through a cooling or refrigeration system. Accordingly, it is necessary to take care that the refrigerant does not escape into the environment. Thus, the tube is used to form a seal against such an escape of refrigerant.

The tube is made of a thin steel sheet material and a stator of the motor is arranged outside the tube. Since the rotor is arranged inside the tube the thickness of the material of the tube should be as small as possible. The thicker the tube is, the larger is the air gap between the stator and the rotor and the lower is the efficiency and the torque of the motor.

The rotor of the motor has to be rotatably supported by a bearing. A simple way to mount the bearing is to deform the housing upon insertion of the bearing into the tube, e.g. by press fit caulking, coining, swaging or the like.

However, the use of a thin material for the tube on the one hand and the use of a press fit for the motor bearing on the other hand leads to another problem. During press fitting of the bearing into the tube the tube deforms. The deformation is more pronounced the thinner the material of the tube is. Accordingly, the tube having press fit with the motor bearing can be provided with quite large tolerances only. The motor has to be adapted to these tolerances with a consequence that the air gap must be increased. The larger the air gap is the smaller is the torque to be transmitted via the air gap.

The valve requires a certain torque to be operated, i.e. to move the valve element, when the air gap increases, the motor must increase as well to provide this torque. This requires additional space which is not satisfactorily.

SUMMARY

The object underlying the invention is to provide a valve having a small motor and a tube and can be produced with low costs.

This object is solved with a valve as described at the outset, in that the motor section and the bearing section comprise different diameters.

In such a tube a deformation of the bearing section can take place without deforming the motor section or with a smaller deformation of the motor section so that the bearing section is a deformed section. A part of the deformation of the bearing section is taken over by the transition zone between the motor section and the bearing section. Accordingly, the motor section can keep the required inner and outer diameter with very low tolerances so that the gap between the stator and the rotor can be kept small as well.

In an embodiment of the invention a transition section between the bearing section and the motor section is inclined with respect to an axis of rotation of the rotor. When the bearing section is slightly expanded during press fitting of the motor bearing, the inclination of the transition section can be changed without changing the dimension of the motor section.

In an embodiment of the invention the bearing section comprises a diameter which is smaller than the diameter of the motor section. The rotor bearing can be inserted into the tube through the motor section into the bearing section without altering the dimension of the motor section.

In an embodiment of the invention the bearing is a first bearing and the bearing section is a first bearing section, wherein the rotor is supported by a second bearing arranged on a side of the motor opposite to the first bearing, the second bearing being mounted in a second bearing section of the tube and the motor section and the second bearing section comprise different diameters. The advantages achieved in the first bearing section are likewise achieved in the second bearing section. The second bearing section is allowed to deform during mounting of the second bearing and this deformation is taken up by the transition between the second bearing section and the motor section. The second bearing section is again a deformed section. This embodiment has the advantage that the rotor is supported on both axial sides of the stator which means that a very stable support is achieved. This stable support helps additionally to keep the air gap small. The motor can be provided with very small tolerances.

In an embodiment of the invention the diameter of the second bearing section is larger than the diameter of the motor section. The first bearing can be inserted through the second bearing section and through the motor section. The rotor can be inserted through the second bearing section into the motor section. Both parts can thus be inserted without effecting the size or the dimension of the second bearing section.

In an embodiment of the invention a second transition section between the motor section and the second bearing section is inclined with respect to an axis of rotation of the rotor. When the second bearing section is deformed during press fitting of the second bearing, such deformation can basically change only the inclination of the second bearing section without affecting the diameter of the motor section.

In an embodiment of the invention the tube is of a metallic material having a thickness of 0.5 mm or less, preferably 0.25 mm or less. Although such a thin material is used the motor section can be kept in the required form with low tolerances even if one or both bearings are fixed to the tube by press fit.

In an embodiment of the invention the metallic material is steel. Steel is sufficiently stable for this purpose and is not affected by most refrigerants.

In an embodiment of the invention the tube is closed at a first end and comprises a flange at the second end which is formed radially outwardly. The closed end of the tubes provide a sealing to the environment without additional parts. The flange at the second end can be used to connect the tube to a valve housing.

In an embodiment of the invention the flange comprises a thickness which is at least 1.5 times the thickness of the tube in the motor section. Such an embodiment is in particular useful when the connection between the flange and the valve housing is made by welding. Although a welding seam is stable enough to withstand even higher pressures, regions of the tube adjacent to the welding seam can be weakened by the welding process. The flange can be used for the welding. When the flange is weakened, is still as strong as the rest of the tube, so that the tube can withstand higher pressures.

In an embodiment of the invention the flange has a radial extension of at least twice the thickness of the tube in the motor section. The welding seam can be positioned at the radial outside of the flange. The radial extension of the flange ensures that the heat produced during welding does not affect the rest of the tube.

BRIEF DESCRIPTION OF THE DRAWINGS

An embodiment of the present invention will now be described in more detail with reference to the drawing, wherein:

FIG. 1 shows a sectional view of an expansion valve,
FIG. 2 shows an enlarged view of a tube,
FIG. 3 shows an enlarged sectional view of a welding connection,
FIG. 4 an enlarged detail K of FIG. 2 of an alternative embodiment and
FIG. 5 the enlarged detail K of third embodiment.

DETAILED DESCRIPTION

In all figures the same elements are denoted with the same reference numerals.

An expansion valve 1 comprises a valve housing 2 having two connectors 3, 4 which are fixed to the housing. A valve seat 5 is part of the valve housing 2 or can be a separate part. A valve element 6 cooperates with the valve seat to control a flow of fluid between the two connectors 3, 4. To this end the valve element 6 can be moved in a direction towards the valve seat 5 to close the valve 1 or in a direction away from the valve seat 5 to open the valve at least partly.

The movement of the valve element 6 is controlled by motor 7, preferably a stepping motor. The motor 7 comprises a stator 8 which is fixed against rotation and a rotor 9 which is rotatably mounted within the stator 8. The rotor 9 is operatively connected to a shaft 10 which bears or forms a lead screw 11 having an outer thread 12. The lead screw 11 is in threaded connection with a lead nut 13 which is fixed against rotation and connected to the valve element 6. When the rotor rotates the shaft 10 and thus the lead screw 11 rotate as well. This rotational movement is translated into a linear movement of the valve element 6 via the pairing of lead screw 11 and lead nut 13.

The valve 1 is used to control a flow of a refrigerant in a cooling or refrigeration system. The escape of refrigerant to the environment must be prevented. To this end a tube 14 is provided which is connected to the valve housing 2 by welding. The tube 14 is arranged between the stator 8 and the rotor 9 of the motor 7. In order to keep an air gap between the stator 8 and the rotor 9 as small as possible, the material of the tube 14 should be as thin as possible as well.

In the embodiment shown the thickness of the material of the tube 14 is 0.2 mm. The material of the tube 14 is steel, preferably stainless steel.

The rotor 9 is supported in a first bearing 15 on one side of the rotor 9 and by a second bearing 16 on the other side of the rotor 9.

First bearing 15 is mounted by press fit in a first bearing section 17 of the tube 14. Second bearing 16 is mounted by press fit in a second bearing section 18 of the tube 14. A motor section 19 is arranged between the first bearing section 17 and the second bearing section 18. Instead of press fit any other mounting process can be used in which the bearing section 17, 18 are deformed to adapt to the outer form of the bearing 15, 16.

The motor section 19 of tube 14 should have tolerances as small as possible to adapt the motor section 19 of the tube 14 to the motor 7 in the best way. However, during press fitting the first bearing 15 into the first bearing section 17 and by press fitting the second bearing 16 into the second bearing section 18 a deformation of the bearing sections 17, 18 is unavoidable.

In order to reduce the risk that the deformation of the first bearing section 17 affects the form of the motor section 19, the first bearing section 17 has a diameter smaller than the rotor section 19 and the second bearing section 18 has a diameter larger than the motor section 19.

A first transition section 20 between the first bearing section 17 and the motor section 19 is inclined with respect to a longitudinal or rotational axis of the rotor 9. A second transition section 21 between the second bearing section 16 and the motor section 19 is inclined relative to the rotational axis of rotor as well. Accordingly, when a deformation of the first bearing section 17 occurs, this deformation cannot propagate to the motor section 19. Such a deformation would deform only parts of the first transition section 20.

The same is true for the second transition section 21. When the second bearing 16 is press fit into the second bearing section 18 the widening of the second bearing section 18 is taken up by the second transition section 21 without affecting the motor section 19. The staggered diameter relation of the first bearing section 17, the motor section 19 and the second bearing section 18 allows mounting of the first bearing 15 in the tube 14 by press fit since the first bearing 15 can be guided without problems through the motor section 19. The rotor 9 can be mounted in the tube 14 since it can be guided without any problems through the second bearing section 18. Finally, the second bearing 16 can be mounted by press fit into the second bearing section 18. Accordingly, the motor section 19 is not deformed even when the bearings 15, 16 are mounted by press fit in the bearing sections 17, 19.

The tube 14 is closed at one end 22 and comprises a flange 23 at the other end. The tube 14 is welded to the valve housing 2 at the end comprising the flange 23.

As can be seen in FIG. 3, the flange 23 is formed radially outwardly and comprises an outer region which runs parallel to a mounting face 24 which is provided at the valve housing 2. The mounting face 24 is provided at a stepped area of the valve housing at the circumference of a front face of the valve housing 2.

The flange 23 has a thickness which is much larger than the thickness of the tube 14 in the motor section 19. The tube can have a constant thickness in all regions outside the flange 23. The flange 23 can, for example, comprise a thickness which is at least 1.5 times the thickness of the tube 14 in the motor section 19.

The flange 23 has a radial extension which is at least twice the thickness of the tube 14 in the motor section 19. In FIG. 3 the thickness of the flange 23 is shown oversized.

A welding seam 25 is positioned at the radial outside of the flange 23 and the mounting face 24 of the valve housing 2.

Even if the welding process would weaken the material of the tube in the range of the flange 23, this is no problem since the thickness of the flange 23 is large enough to withstand the pressures inside the tube even when weakened.

Since the welding seam 25 is arranged at the radially outermost position possible, the rest of the tube 14 is not affected by the welding process, i. e. heat produced during the welding does not damage the tube 14. Welding can be performed, for example, by using a laser beam.

The mounting face 24 surrounds a step 26 of the valve housing. An air gap between the tube 14 and the step 26 is kept small. It is basically only present in an area around a rounded corner 27 produced during forming the flange 23 out of the tube 14. The rounded corner 27 is a result of a deep drawing process by which the tube 14 is formed.

A deformation caused by the welding process is limited to the second bearing section 18 and does not affect the motor section 19 of the tube.

The valve 1 can be mounted using a unit shown in FIG. 2 comprising the tube 14 and the rotor 9 together with the bearings 15, 16 in the bearing section 17, 18. Since the bearings 15, 16 are mounted with press fit in the bearing sections 17, 18, the unit can be handled without the risk that parts are falling out of the unit.

After attaching the lead nut 13 and the valve element 6 to the unit, the unit can be fixed to the valve housing 2 by welding, i. e. by producing the welding seam 25. Thereafter the stator 8 can be placed around the tube 14.

There are a number of possibilities to fix the bearings 15, 16 to the tube 14. As mentioned above, the bearing 15 and the bearing 16 can be fixed to the tube by press-fitting. During press-fitting the diameter of the bearing sections 17, 18 is slightly enlarged which produces an internal tension in the tube clamping the bearings 15, 16 in the desired position.

FIG. 4 shows another possibility to fix the first bearing 15 to the first bearing section 17 of the tube 14. The same way of fixation can be used for the second bearing 16.

The first bearing 15 comprises a recess 28 in its circumferential face. The first bearing section 17 comprises an indentation 29 protruding into the recess 28. The indentation 29 can be formed into the recess 28 after the first bearing 15 has been positioned within the tube 14. The indentation 29 requires again a deformation of the tube 14. However, this deformation is not critical, since it is limited to the first bearing section 17.

FIG. 5 shows a third possibility. In this possibility the first bearing 15 comprises a step 30, i. e. a larger diameter remote from the rotor 9 and a slightly smaller diameter adjacent to the rotor 9. The first bearing section 17 comprises again an indentation 29 which is produced by deforming the first bearing section 17 after mounting the first bearing 15 in the tube 14.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A valve comprising a valve element driven by a rotary motor, wherein the motor comprises a rotor arranged inside a motor section of a tube and the rotor is supported by a bearing, which bearing is mounted in a bearing section of the tube, wherein the motor section and the bearing section comprise different diameters, wherein the bearing is press fit in the bearing section and a transition section between the bearing section and the motor section is inclined with respect to an axis of rotation of the rotor, wherein the bearing is a first bearing and the bearing section is a first bearing section, wherein the rotor is supported by a second bearing arranged on a side of the motor opposite to the first bearing, the second bearing being mounted in a second bearing section of the tube, wherein the motor section and the second bearing section comprise different diameters, wherein the second bearing is arranged wholly within the tube, and wherein the tube is closed at a first end and comprises a flange at a second end which is formed radially outwards from the tube.

2. The valve according to claim 1, wherein the bearing section comprises a diameter which is smaller than a diameter of the motor section.

3. The valve according to claim 2, wherein the tube is made of a metallic material having a thickness of 0.5 mm or less.

4. The valve according to claim 1, wherein the diameter of the second bearing section is larger than the diameter of the motor section.

5. The valve according to claim 4, wherein a second transition section between the motor section and the second bearing section is inclined with respect to the axis of rotation of the rotor.

6. The valve according to claim 4, wherein the tube is made of a metallic material having a thickness of 0.5 mm or less.

7. The valve according to claim 1, wherein a second transition section between the motor section and the second bearing section is inclined with respect to the axis of rotation of the rotor.

8. The valve according to claim 7, wherein the tube is made of a metallic material having a thickness of 0.5 mm or less.

9. The valve according to claim 1, wherein the tube is made of a metallic material having a thickness of 0.5 mm or less.

10. The valve according to claim 9, wherein the metallic material is steel.

11. The valve according to claim 1, wherein the flange comprises a thickness which is at least 1.5 times the thickness of the tube in the motor section.

12. The valve according to claim 1, wherein the flange has a radial extension of at least twice the thickness of the tube in the motor section.

13. The valve according to claim 1, wherein the first bearing comprises a recess and the first bearing section comprises an indentation that protrudes into the recess.

14. The valve according to claim 1, wherein the valve is an expansion valve.

* * * * *